INVENTOR.
RAGNAR W. WINBERG
BY Amster & Levy
ATTORNEYS

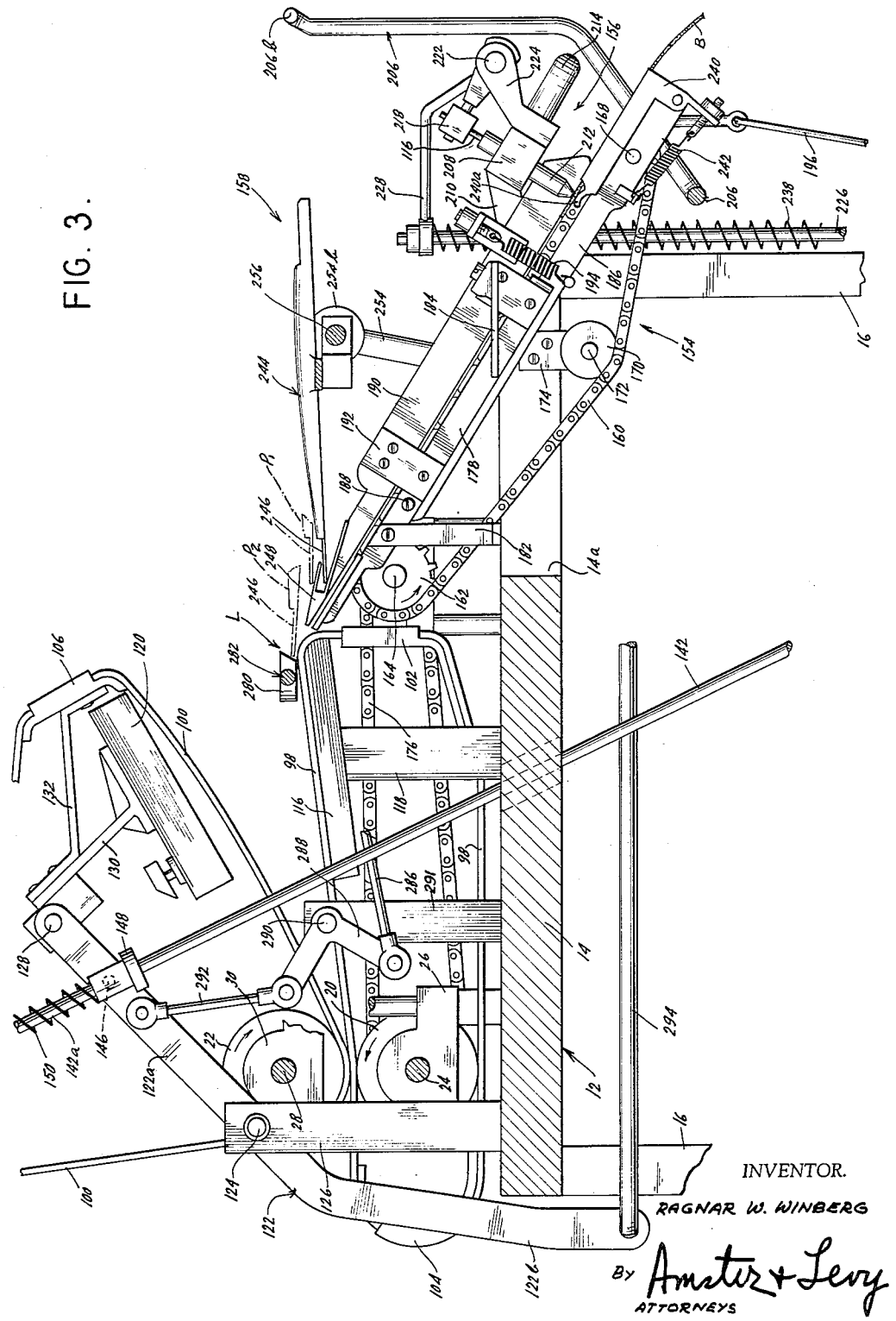

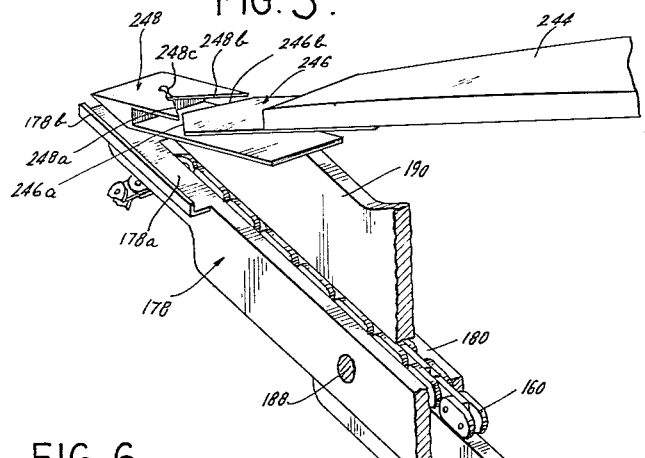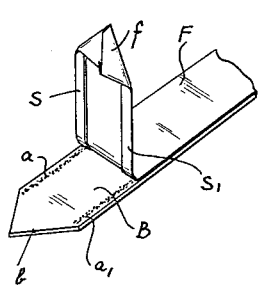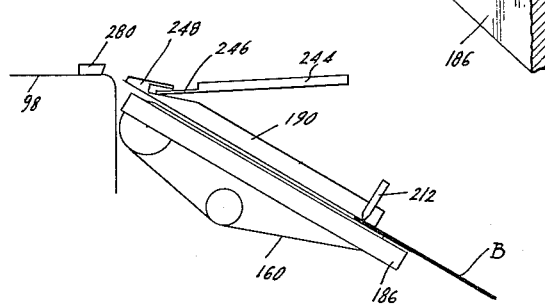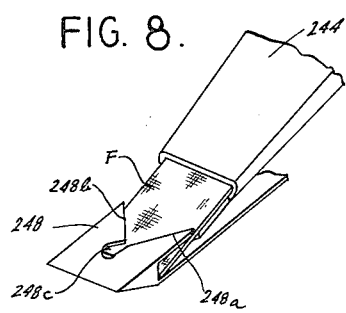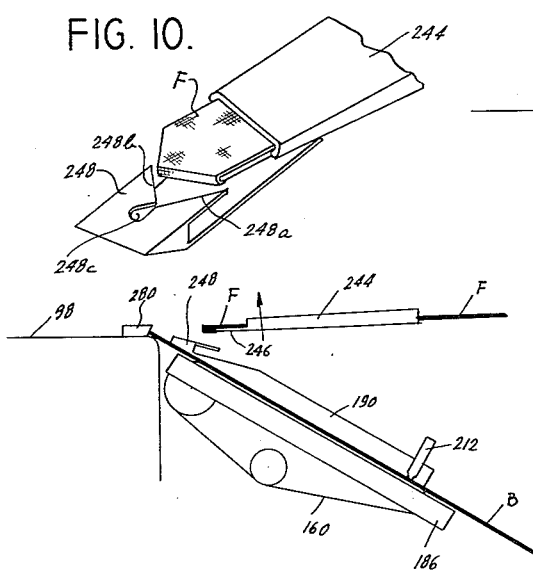

July 31, 1962
R. W. WINBERG
3,047,047
APPARATUS FOR FORMING A BELT ASSEMBLY
INCLUDING A BACKING AND FACING
Filed Feb. 2, 1959
5 Sheets-Sheet 5
FIG. 11.
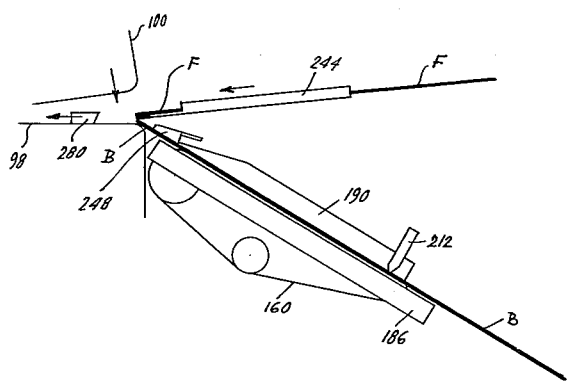
FIG. 12.
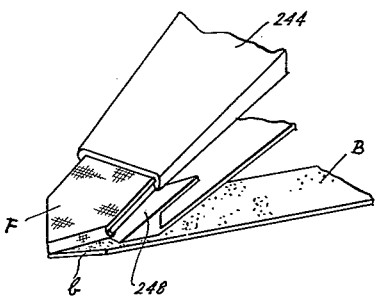
FIG. 13.
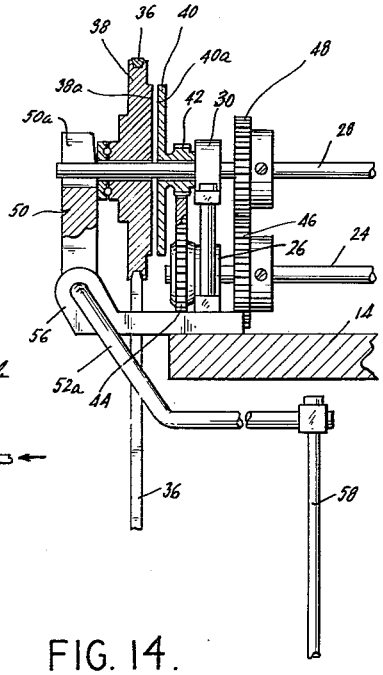
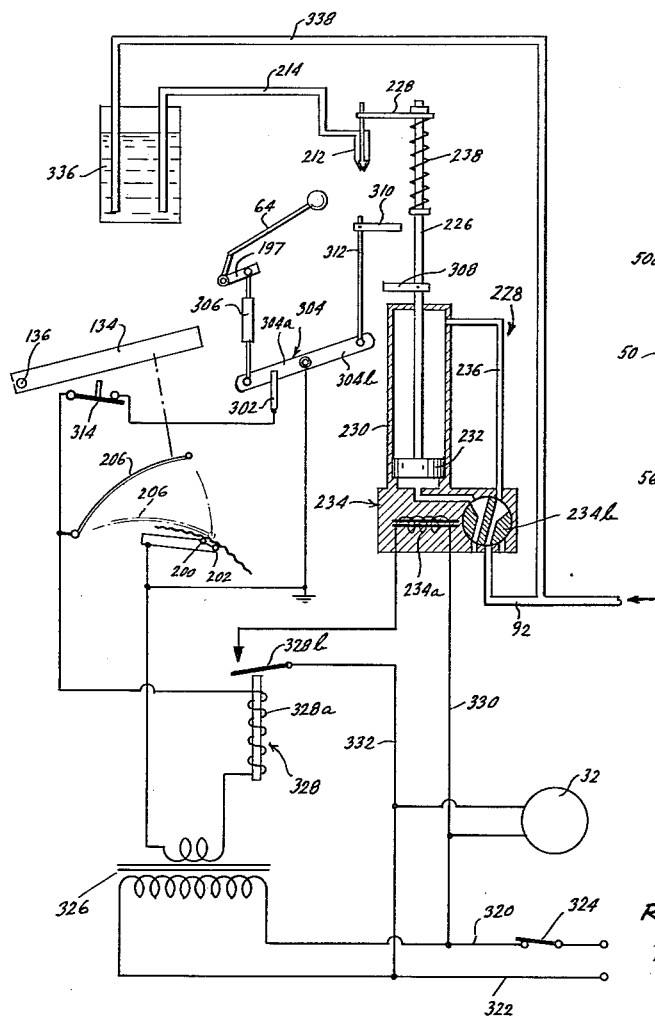
FIG. 14.
INVENTOR.
RAGNAR W. WINBERG
BY Amster + Levy
ATTORNEYS United States Patent Office 3,047,047
Patented July 31, 1962

3,047,047
APPARATUS FOR FORMING A BELT ASSEMBLY
INCLUDING A BACKING AND FACING
Ragnar W. Winberg, 115 W. Elder Ave.,
Floral Park, N.Y.
Filed Feb. 2, 1959, Ser. No. 790,732
13 Claims. (Cl. 156—356)

The present invention relates generally to assembly apparatus, and in particular to an improved machine for the assembly of belts of the type including a backing and facing joined in coextensive relation.

In my U.S. Patent No. 2,635,670 issued on April 21, 1953, there is disclosed a method and apparatus for manufacturing belts in which successive lengths of facing material are adhesively secured to a continuous length of belt backing, with each length of facing material having its opposite sides folded under and its leading end turned under to form a V-shaped point. With such a machine, the operator feeds successive lengths of the material for the belt through a side-folding and point-forming mechanism; and then by operation of the machine causes the facing material with its opposite side edges folded under and its forward end pointed to be adhesively secured to the belt backing. With this type of machine, it is necessary to manufacture belts with facing materials which are appropriate for a particular supply (i.e. color) of belt backing which is fed into the machine, unless the machine is stopped and the supply of belt backing is replaced. Further, it is necessary to employ a worker other than this operator, usually standing behind the machine, to cut the belt backing intermediate successive belts, since such successive belts are joined together by the continuous belt backing or lining. The additional worker usually cuts the belt backing in the V-shaped configuration of the folded leading end of the belt facing, following the outline of the point on the belt. Thereupon in a second separate operation it is usually the practice to stitch along the opposite side of the belt and across he V-shaped point to complete the joinder of the belt facing and belt backing.

In many belt manufacturing establishments, the work coming from the customer is in the form of a bundle of lengths of belt facing, usually of the same or matching fabric to the garment on which the belt is to be used and including facings of a particular length or size but varying in color. The bundle of belt facings is usually given to an operator who matches and cuts successive lengths of belt backing or lining which are appropriately pointed at one end. Thereupon the matched bundle of belt facings and belt backings are given to the sewing machine operator who pairs up successive lengths of backing and facing, manually folds the point, and then joins the facing and backing together on the sewing machine. Although the belt-making method and apparatus of my patent represents a material improvement over the hand methods and machines heretofore employed, in some situations such method and apparatus are not compatible with the existing systems employed in belt manufacturing establishments; and unless provision is made for running a large number of belts with the facings matching one particular color of backing or lining, much of the efficiency of my improved method and apparatus is lost by the necessity of shutting down and changing over to a different color of belt backing or lining.

Broadly, it is an object of the present invention to provide an improved machine for the manufacture of belts of the type including a backing or lining joined to a length of facing material. Specifically, it is within the contemplation of the present invention to provide a belt-making machine capable of joining together successive cut lengths of belt backing with successive cut lengths of belt facing.

In accordance with an illustrative embodiment demonstrating features and advantages of the present invention, my improved belt-making machine for forming a belt assembly including a backing and facing joined in superposed relation and pointed at its leading end comprises a support, conveying means adapted to engage the leading end of a length of backing and the leading end of a length of facing at a pickup location and to advance the assembly along a laminating path, means for advancing a length of backing along the feed path toward the laminating path for bringing the leading end of the backing into the pickup location, a side-turning and point-forming mechanism for turning under the sides and pointing the forward end of a length of facing including a male pointer blade operative to advance the pointed leading end of the facing into the pickup location, a stop at the pickup location for the respective leading ends of backing and facing and means operative to move the stop out of the pickup location and engaging the drive of the conveying means such that the facing and backing may be advanced along the laminating path to be joined together.

Advantageously belt-making machines constructed in accordance with my invention are compatible with existing systems employed in belt-making establishments and enable the machine operator to manually place a length of belt-backing into the machine matched to a particular length of belt facing, and upon feeding of the length of belt facing into the machine, to join the facing and backing together. The machine facilitates the handling of individual lengths of belt backing, with good registry between the V-shaped leading end of the length of backing and the V-shaped point formed on the leading end of the length of the facing. Still further, the machine is very flexible in use and eliminates the necesity of provision for cutting apart successive lengths of belts as is required in a machine of the type employing a continuous supply of belt backing or lining.

The above brief description as well as further objects, features and advantages of the present invention will be more fully appreciated by reference to the following detailed description of a presently preferred, but illustrative, embodiment of a belt making machine in accordance with the present invention, when taken in conjunction with the accompanying drawing, wherein:

FIG. 3 is a longitudinal section, on an enlarged scale, taken substantially along the lines 3—3 of FIG. 2 looking in the direction of the arrows;

FIG. 4 is a fragmentary perspective view showing a typical belt assembly, with the facing folded back for the purposes of illustration;

FIG. 5 is a perspective view, on an enlarged scale, showing the details of the side-turning and point-folding mechanism for forming a V-shaped point on the leading end of a length of facing and the feeder for advancing a length of backing into position for joinder with the length of facing;

FIG. 6 is a shematic view of the point-forming mechanism and the feeder, shown with a length of backing advanced into a position where its leading end is beneath the nozzle of an adhesive-applying unit along the feed path for the backing;

FIG. 7 is a schematic view, similar to FIG. 6, but with the length of backing shown fed into an intermediate assembly position and with the length of facing fed through the edge or side-turning and point-forming mechanism preliminary to the formation of the point;

FIG. 8 is a perspective view, on an enlarged scale, showing the relative position of the male pointer element and the female pointer element preliminary to point forming and corresponding to the position shown schematically in FIG. 7;

FIG. 9 is a schematic view, similar to FIG. 7, but showing the position of the point-forming mechanism after formation of the V-shaped point on the leading end of the length of facing;

FIG. 10 is a perspective view, on an enlarged scale, similar to FIG. 8 but showing the relative position of the male pointer element and the female pointer element after the formation of the V-shaped point on the leading end of the length of fabric;

FIG. 11 is a schematic view, similar to FIG. 9, but showing the length of backing and the length of fabric with its leading end folded and moved into a pickup location relative to pressing and conveying mechanism which is effective to simultaneously move the backing and facing along a laminating path for joining the facing and backing together;

FIG. 12 is a perspective view similar to FIG. 10, but showing the point-forming element after completion of the point and advance thereof into position for delivering the V-shaped pointed end of the length of facing into coextensive relation with the V-shaped leading end of the length of backing;

FIG. 13 is a sectional view taken substantially along the line 13—13 of FIG. 2, showing the details of the drive and clutch mechanism for the presser rollers of the pressing and conveying mechanism employed in the machine; and FIG. 14 is a schematic and diagrammatic view showing the interconnection of the several controls incorporated in my belt-making machine.

Figure 1:
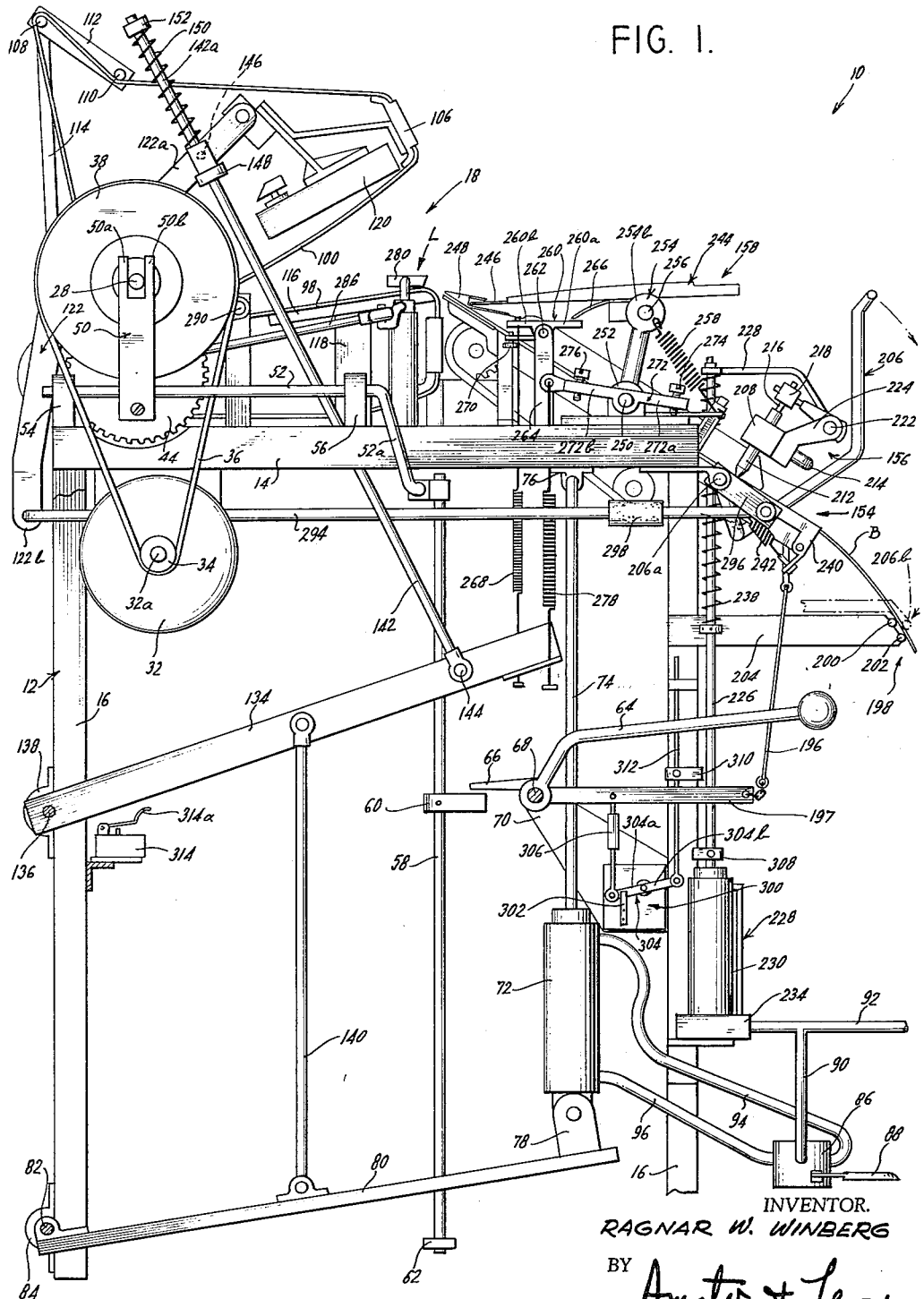
FIG. 1 is an elevational view of an improved belt-making machine in accordance with the present invention.

Referring now specifically to the drawings, there is shown a typical belt-making machine in accordance with the present invention, which is generally designated by the reference numeral 10, and includes a support 12 having a horizontally extending bed plate 14 at table height which is supported on dependings legs 16.

Mounted on the bed plate 14 of the support 12 is a pressing and conveying mechanism 18 which includes lower and upper coacting presser rollers 20, 22 journaled one above the other for rotation about spaced horizontal axes. The lower presser roller is fixed to a supporting shaft 24 which is journaled on appropriate bearings 26 at its opposite ends and the upper presser roller 22 is similarly supported on a shaft 28 which is journaled on appropriate bearings 30 at its opposite ends. Operatively connected to the presser rollers 20, 22, is a drive which includes a selectively engageable clutch, the details of which are seen best in FIGS. 1, 2, and 13. The drive includes a motor 32 which is mounted beneath the bed plate 14 of the machine which has a pulley 34 fixed to its output shaft 32a. Trained about the pulley 34 is a V-belt 36 which is also engaged about a further pulley 38. The pulley 38 is journaled on the shaft 28 for the upper roller 22 for rotation thereabout and axial displacement therealong. The pulley 38 serves as a driver element of the selectively engageable clutch which includes a driven element 40 journaled on the shaft 28. The driven element 40 has an integral gear 42 which is in meshing engagement with a further gear 44 fixed to the shaft 24 of the lower presser roller 20, such that the lower presser roller 20, is rotated in response to engagement of the clutch. The presser rollers 20, 22 are geared together for rotation in unison, as indicated by the directional arrows in FIG. 3, by the meshing gears 46, 48 fixed respectively to the shafts 24, 28. The contact faces 38a, 40a of the clutch elements 38, 40 are provided with appropriate frictional surfaces and are brought into contact with each other to complete the drive chain from the motor 32 via the gearing 42, 44, 46, 48 by means of a bifurcated or forked clutch-engaging member 50. The clutch-engaging member is rockably mounted on the bed plate 14 on a rocker shaft 52 for rocking movement in a direction appropriate to selectively engage and disengage the clutch elements 38, 40. Specifically, the clutch engaging member 50 includes fingers 50a, 50b which straddle opposite sides of the shaft 28 of the upper presser roller 22 and bear against the adjacent bearing for the pulley 38. The clutch-engaging member 50 is fixed to the rocker shaft 52 which in turn is journaled lengthwise of the bed-plate 14 in bearings 54, 56. As seen in FIGS. 1 and 13 a downwardly directed pull on the crank arm 52a of the rocker shaft 52 is effective to rock the clutch-engaging member in a direction appropriate to engage the clutch elements 38, 40, while an upwardly directed push on the crank arm 52a will allow the clutch elements to return to the disengaging position illustrated in FIG. 13.

Provision is made for manually and pedally engaging the clutch elements to impart drive to the presser rollers 20, 22. Specifically, and as seen best in FIG. 1, a connecting rod is operatively connected to the crank arm 52a of the rocker shaft 52 and is provided with first and second stops 60, 62 adjustably secured thereto at spaced points therealong. Journaled on the machine frame is a hand lever 64 of a manually operated control which carries a projecting finger 66 adapted to overlie and engage the stop 60. The hand lever 64 is journaled for rotation about a transverse horizontal axis by means of a stub shaft 68 journaled in a bracket 70 mounted on one of the forward legs 16 of the machine frame 12. In response to counter-clockwise rotation of the hand lever 64 about the stub-shaft or axle 68 (see FIG. 1) the stop 60 is urged downwardly which in turn rocks the rocker shaft 52 in a direction appropriate to engage the clutch elements. The pedally operated clutch control includes a double-acting piston (not seen) mounted within a cylinder 72 and having an upwardly projecting piston rod 74 pivotally connected at its upper end by means of a bracket 76 to the under side of the bed-plate 14. The cylinder 72 is pivotally mounted on a supported bracket 78 fixed to a lower operating lever 80 which extends lengthwise of the machine frame and is mounted at its rearward end at a pivot 82 carried on a bracket 84 fixed to one of the rear legs of the machine frame. The lower operating lever 80 when rocked in the clockwise direction about the pivot 82 (see FIG. 1), contacts the lower stop 62 on the connecting rod 58 to engage the clutch elements 38, 40. The lower operating lever is rocked in the clockwise direction in response to the admission of air to the lower end of the cylinder 72 such that the reciprocally mounted piston is driven upwardly to increase the effective spacing between the brackets 76, 78. Conversely, the lower operating lever is restored to the illustrated position upon the admission of air to the upper end of the cylinder 72. To this end, there is provided a conventional two-way air valve 86 which is operated by the foot pedal 88. The air valve is arranged to receive air via a branch conduit 90 from the air inlet pipe 92 and to either direct the air via the outlet pipe 94 to the upper end of the cylinder 72 or via the outlet pipe 96 to the lower end of the cylinder 72. Normally, the air valve 86 is set to direct the air from the air inlet pipe 92 through the air outlet pipe 94 such that the piston is driven to the lower end of the cylinder 72 and the lower operating lever 80 is in its upper or inoperative position. Upon depressing the foot-pedal 88 the valve 86 is operated and the air is directed to the outlet pipe 96 which is effective to drive the piston rod 74 upwardly which causes the cylinder 72 to move downwardly thereby rocking the lower operating lever 80 in the clockwise direction to achieve several control functions, including the timed operation of the drive for the presser rollers 20, 22 after a prescribed lost motion travel of the lower operating lever 80. The several functions achieved by operation of the pedally controlled air valve 86 will appear as a description proceeds.

Figure 2:
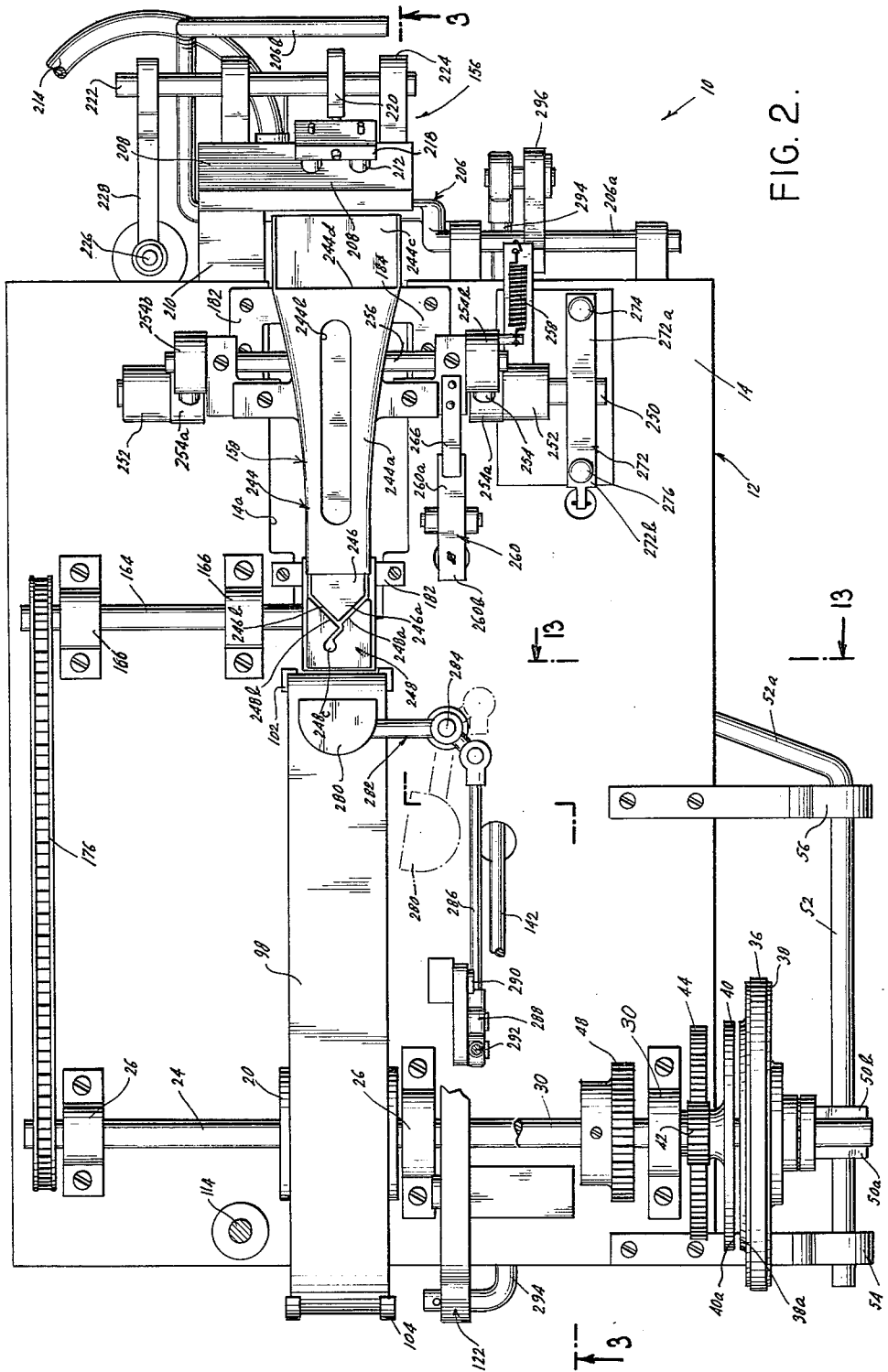
FIG. 2 is a plan view of the belt-making machine shown in FIG. 1.

A conveying system including a first or lower conveyor belt 98 and a second or upper conveyor belt 100, as best seen in FIGS. 2 and 3, are arranged to engage the leading ends of a length of backing B and a length of facing F at a pick-up location, generally designated by the letter L, and to advance the same in unison toward and through the presser rollers 20, 22. The first or lower conveyor belt 98 extends through a forward belt guide 102 which is mounted on the bed plate 14 and through a rearward belt guide 104 which is likewise mounted on the bed plate 14 but is spaced beyond the lower presser roller 20. The second or upper conveyor belt 100 extends through a forward belt guide 106, is trained about the periphery of the upper presser roller 22 and threaded through tensioning rollers 108, 110 which are carried on a tension roller plate 112 fixed to the upright 114. Underlying the lower conveyor belt 98 and extending for a substantial distance from the pick-up location L toward the nip of the presser rollers 20, 22 is a stationary presser iron 116 which underlies a portion of the upper run of the lower conveyor belt 98 and is mounted on an appropriate upstanding bracket 118 fixed to the bed plate 14. Disposed within the upper conveyor belt 100 and behind the lower run thereof is a movable presser iron 120 which is mounted to move into cooperating relation with the fixed presser iron 116, such that heat may be applied to the assembly of the backing B and facing F as it moves from the pick-up location L toward the nip of the presser rollers 20, 22. In this illustrative embodiment the movable presser iron 120 is mounted on a double-arm mounting lever 122 which has a pivotal mount 124 intermediate its ends on the standard 126 fixed to the bed plate 14 of the machine. The upwardly and forwardly projecting arm 122a of the mounting lever 122 has a pivotal connection 128 to a mounting bracket 130 which is fixed to the rear surface of the movable presser iron 120, with a further mounting bracket 132 being fixed to the bracket 130 and serving as a support for the forward belt guide 106. It will be appreciated that a downward pull on the upwardly projecting arm 122a of the mounting lever 122 will be effective to move the upper conveyor belt 100 into a position overlying the lower conveyor belt 98, with the upper or movable presser iron 120 confronting the stationary presser iron 116 and separated therefrom by the intermediate runs of the conveyors. The movement of the upper presser iron is achieved by means of an upper operating lever 134 (see FIG. 1) which extends in substantial parallelism with the lower operating lever 80 and has a pivotal mount 136 at its rearward end to a rearward leg 16 of the machine frame by means of a bracket 138. The upper operating lever 134 is connected to the lower operating lever 80 by means of a coupling rod 140 in turn the upper operating lever 134 is connected to the arm 122a of the mounting lever 122 by a connecting rod 142 which has a pivotal connection 144 at its lower end to the upper operating lever 134 and a pivotal connection 146 at its upper end to the arm 122a of the mounting lever 122. The pivotal connection 146 is provided by a mounting sleeve 148 through which the connecting rod 142 loosely extends such that a portion 142a of the connecting rod 142 extends above the pivotal connection 146. Surrounding the upwardly extending portion 142a of the connecting rod is a spring 150 which bears at one end against the sleeve 148 and at its upper end against a shoulder 152 fixed to the connecting rod 142. The spring 150 normally urges the mounting lever 122 into the inoperative position illustrated in FIGS. 1 and 3. However, in response to a downwardly directed pull on the connecting rod 142 upon rocking movement of the lower and upper operating levers 80, 134 about their respective pivotal mounts 82, 136, the upper conveyor belt 100 and the presser iron 120 move downwardly into their engaged or operative position relative to the lower conveyor belt 98 and lower presser iron 116.

Extending upwardly and forwardly toward the pick-up location L is a belt-backing feeder, generally designated by the reference numeral 154, which incorporates an adhesive-applying head or unit 156. The feeder 154 is effective to advance successive cut lengths of belt-backing B upwardly and forwardly toward the pick-up location L with the application of one or more lines of adhesive to the uppermost face of the belt-backing B.

Disposed forwardly of and extending toward the pick-up location L is a side turning and point-forming mechanism, generally designated by the numeral 158, which is effective during the automatic operation of the machine to turn under the opposite sides or edges or the length of belt facing F and to form a V-shaped point on the forward or leading end of the length of belt facing F. FIG. 4 illustrates a typical belt assembly in accordance with the present invention wherein it is seen that the belt-backing B which is initially formed with a V-shaped point $b$ and lines of adhesive $a$, $a'$ along its opposite sides is joined to a length of belt facing F having its opposite sides S, $S_1$ folded under and having its leading end $f$ formed into a V-shaped point. Detailed reference will now be made to the drawings for the description of the operating mechanisms of the belt-backing feeder 154, the adhesive-applying head or unit 156 and the side-turning and point-forming mechanism 158 and their coordination into the overall machine operation.

The belt-backing feeder 154 which advances successive lengths of belt backing B through the adhesive-applying head or unit 156 and toward the pickup location L is seen best in FIGS. 1 to 3 inclusive and includes a chain conveyor 160. The chain conveyor 160 is trained at its forward end about a sprocket 162 fixed to a sprocket shaft 164 which extends transversely of the bed plate 14 of the machine and is appropriately journaled thereon by bearings 166. At its rearward end the chain conveyor 160 is trained about a sprocket (not shown) affixed to a sprocket shaft 168 of a guiding mechanism associated with the chain conveyor 160. A further idler sprocket 170 is supported on an axle 172 journaled on a depending bracket 174 fixed to the bed plate of the frame 14, with the idler sprocket 170 engaging the lower run or course of the chain conveyor 160. The shaft 164 of the driven sprocket 162 is connected to and driven from the shaft 24 by an appropriate connecting chain 176 (see FIG. 2) which is trained about respective sprockets on the shafts 24, 164. Disposed at opposite sides of the upper run or course of the chain conveyor 160 are conveyor side guide members 178, 180 which are upwardly inclined from their rearward ends to their forward ends and are fixed to the bed plate 14 by appropriate brackets or fixtures 182, 184 to straddle the upper run of the conveyor chain 160 (see FIG. 5). The forward ends of the conveyor side guide members 178, 180 are formed with lateral extensions (such as the extension 178a on the guide member 178, as seen in FIG. 5) and upstanding shoulders (such as the shoulder 178b of the guide member 178, as seen in FIG. 5). The upstanding shoulders are laterally spaced at a distance substantially equal to the width of the belt backing B to laterally confine and guide the belt backing during its movement toward the pick-up location L. The rearward portion of the conveyor side guide members 178, 180 extend downward through a cut-out 14a in the bed plate 14 and are supported toward their rearward end by the mounting brackets 182, 184. Pivotally mounted intermediate the conveyor side guide members 178, 180 is a bottom guide member 186 which underlies a substantial portion of the top run of the chain conveyor 160. The conveyor bottom guide member 186 has a pivotal mount 188 at its forward end on the guide members 178, 180 and supports the sprocket shaft 168 for the rear sprocket of the chain conveyor 160 such that the rearward end of the chain conveyor may be swung downwardly to a clearance position to aid in the insertion of the belt backing into the machine as will subsequently become apparent. Overlying the top run of the chain conveyor 160 is a top guide member 190 which textends over a substantial portion of the chain conveyor 160. The top guide member 190 is supported in the requisite vertical spaced relation to the side guide members 178, 180 by appropriate connecting brackets, such as bracket 192. As best shown in FIGS. 1 and 3 and in the diagrammatic showings of FIGS. 5 to 10 inclusive the belt backing B may be fed into the space intermediate the top run of the chain conveyor 160 and underlie the top guide member 190 and advanced therealong to the pickup location L. The bottom guide member 186, which is rockably about the pivotal mount 188 to various vertically adjusted positions is normally held in a position in alignment with the side guide members 178, 180 by the provision of a spring 194 which is fixed at its lower end to the bottom guide member 186 and is adjustably secured at its upper end to the stationary top guide member 190. It will be appreciated that by the application of a clockwise turning force to the bottom guide member 186, such guide member and the portion of the conveyor supported thereon may be swung about the pivotal mount 188 to facilitate the insertion of the leading end of belt backing B into the belt-backing feeder 154. As seen best in FIGS. 1 and 3, the bottom guide or presser member 186 may be swung in the clockwise direction against the biasing effect of the spring 194 by exerting a downward pull on the connecting rod 196 which is coupled to an arm 197 which is connected to the hand lever 64 and projects forwardly from the pivotal mount 68.

In advance of the belt-backing feeder path defined by the chain conveyor 160 and the cooperating guide members 178, 180, 188 and 190 a detecting or sensing system, generally designated by the reference numeral 198, which provides a signal in the control system when the trailing end of the belt backing B has passed therethrough during its feed by the belt-backing feeder 154. The detecting system 198 which is disposed forwardly, of, below and in line with the belt-backing feeder 154 includes a pair of spaced, transversely-extending stationary detecting elements 200, 202 which are fabricated of electrically conducted material and are ground via a mounting arm 204. Movably mounted on the support 12 is a further detecting or feeler element 206 formed at one end with a supporting shaft section 206a which is journaled on the frame to rockably mount the detecting element 206 for rocking movement about a substantially horizontal and transverse axis. The other end of the detecting element 206 terminates in a transversely detecting finger 206b which is swingable into an operative position (see the dotted line in FIG. 1) cradled between the stationary detecting elements 200, 202 and normally separated therefrom by the length of belt backing B. When the trailing end of the length of belt backing B runs out, an electrical contact is completed between the elements 200, 202 and the detecting finger 206b in the control system for a purpose to be subsequently described in connection with the schematic diagram of FIG. 14.

The adhesive-applying head or unit 156, which is disposed along the belt-backing feeder 154 and is adapted to apply one or more parallel lines of adhesive (such as lines a, a1, (FIG. 4) to the opposite sides of the belt backing B includes a dispensing housing 208 which is fixed to the bed plate of the machine on an appropriate mounting bracket 210 and includes a pair of dispensing nozzles 212 disposed in side by side spaced relation. The dispensing nozzles 212 depend from the dispensing housing 208 and are in position to overlie and supply the required lines of adhesive to the uppermost face of the length of backing B as it passes along the path defined by the feeder 154. The dispensing housing 208 is connected by an appropriate flexible conduit 214 to an adhesive reservoir and is either gravity fed or fed under pressure in accordance with principles which are generally well understood. For the present purposes it will suffice to point out that the feeding of adhesive to the dispensing nozzles 212 is controlled by operation of respective normally closed valve plungers 216 which reciprocate axially of the respective nozzles 212, as shown diagrammatically in FIG. 14. The valve plungers are simultaneously moved to the open position by means of a common actuating head 218 which is connected to a rocker arm 220 fixed to a rocker arm shaft 222 journaled on bearings 224 fixed to the dispensing housing 208, as seen best in FIGS. 1 and 2. The rocker arm shaft 222 and the rocker arm 220 are turned in the clockwise direction (see FIG. 3) to open the dispensing nozzles 212 by a connection to a vertically extending piston rod 226 which has its upper end connected via a coupling link 228 to one end of the rocker arm shaft 222. In response to an upwardly directed thrust imparted to the piston rod 226, a rocking motion will be imparted to the rocker arm shaft 222 appropriate to open the respective valve plungers 216 via the elements 228, 222, 220, 218. As seen in FIGS. 1 and 2 and shown diagrammatically in FIG. 14, the piston rod 26 is vertically reciprocated by an air-operated, solenoid-controlled actuating mechanism, generally designated by the reference numeral 228. The actuating mechanism includes a cylinder 230 in which is reciprocably mounted a piston 232 which is fixed to the piston rod 226, the arrangement being recognized as a conventional double-acting cylinder and piston. The actuating mechanism 228 includes a solenoid controlled valve 234, shown in detail in FIG. 14, having a solenoid coil 234a which controls the setting of a rotatable valve element 234b. In the illustrated normal position, the valve element 234b is set such that the air inlet pipe 92 communicates with the upper end of the cylinder 230 via the branch piston 236 such that the piston 232 is normally in the lowermost position corresponding to closing of the dispensing nozzles 212 of the adhesive-applying unit 256. A spring 238 encircles the piston rod 226 and is appropriately operatively connected thereto and to the coupling link 228 to allow for the lost motion travel of the piston rod 226 as will hereinafter be described. In response to operation of the solenoid-controlled valve 234, the air from the inlet pipe 92 may be ported to the lower end of the cylinder 230 to drive the piston 232 and the piston rod 236 through the requisite upward stroke for opening the dispensing nozzles 212 of the adhesive-applying unit 156 and for an additional control function, as which will hereinafter be described. The adhesive-applying head or unit 156 is completed by the provision of a back-up plate 240 which is pivotally mounted on the lower conveyor guide member 186 at its foremost end and includes respective forwardly extending fingers 240a adapted to underlie the dispensing nozzles 212, which fingers 240a are normally separated from the nozzles by the interposed length of belt backing B. The fingers 240a of the back-up plate 240 are biased toward the nozzles 212 by an appropriate spring 242 which is operatively connected between the back-up plate 240 and the lower guide member 186, with provision for adjusting the tension of the spring 242 in accordance with the desired bias to be imparted to the fingers 240a.

The side-turning and point-forming mechanism 158, which is of generally known construction, includes a side folder 244 which is constructed to turn under the opposite sides S, S1 of the length of belt facing F when fed therethrough. The side folder 244 includes an elongated folder body 244a which is formed with an elongated slot 244b which facilitates the initial threading therethrough of the forward end of the length of belt facing F and a flange 244c at the trailing end thereof which leads into a flared mouth 244d, with the flange 244c having its opposite sides upturned to laterally confine the length of fabric as it is introduced through the open mouth 244d for feed through the body 244a of the side folder 244.

Projecting forwardly of the side folder is a male point-forming member 246 terminating in a V-shaped pointing tongue having fold-forming edges 246a, 246b. The male point-forming member cooperates with a female point-forming member 248 which is mounted on the forward end of the top conveyor guide member 190. The female point-forming member 248 includes fold-forming edges 248a, 248b which meet at an apex opening into the leading end of an angularly-disposed throat 248c. The co-action of the elements of the side-turning and point-forming mechanism 158 may be best appreciated by progressive reference to FIGS. 5 to 10 inclusive. Normally the male point-forming member 246 has its fold-forming edges 246a, 246b disposed below the complementary fold-forming edges 248a, 248b of the female point-forming member 248, as shown in FIGS. 5 and 6. Thereupon the operator inserts the length of belt facing F through the open mouth 244d of the side folder 244 and advances the leading end of the length over the V-shaped point-forming tongue, with the leading end lying beneath the complementary fold-forming edges of the female point-forming member 248, as shown in FIGS. 7 and 8. Thereupon the male point-forming member 246 is displaced upwardly and then forwardly relative to the female point-forming member 248 such that the respective fold-forming edges 246a, 248a and 246b, 248b form respective V-shaped folds on the leading end of the length of belt facing F, with the angularly disposed throat 248c providing for the sequential operation of the folding edges. Upon the completion of the forward thrust of the male point-forming tongue or member 246, the leading end of the length of belt facing F is folded into a V-shaped point and advanced into the pickup location L for joinder to the length of belt backing B, as will be hereinafter described. The side folder 244 and male point-forming member 246 are mounted for upward movement relative to the female point-forming member 248 and for forward thrust relative to the female point-forming member by a carrier shaft 250 which extends transversely of the machine (see FIG. 2) and is journaled on the bed plate 14 of the support or frame 12 by bearings 252. Fixed to and projecting upwardly from the carrier shaft 250 are a pair of carrier arms 254 each of which includes a hub section 254a encircling the carrier shaft 250 and secured thereto and terminating at its upper end in a bearing section 254b. Journaled in respective bearing sections 254b of the carrier arms 254 is a folder rocker shaft 256 which supports the assembly of the side folder 244 and the male point-forming member 246. As may be best appreciated by consulting FIG. 3, the side folder 244 and the male point-forming member 246 may be rocked about the rocker shaft 256 from the full line position to the first intermediate position, designated by the letter $P_1$, which turns down the forward corners of the length of fabric F; and then by rocking movement of the entire assembly on the carrier shaft 250, the male point-forming member 246 may be thrust forward to the final position, designated by the letter $P_2$, wherein the leading end of the length of fabric F is pointed and positioned and at the pickup location L for joinder to the length of belt backing B. The intermediate position $P_1$ of the folder is shown diagrammatically in FIGS. 9 and 10 while the final position $P_2$ for the folder is shown diagrammatically in FIGS. 11 and 12.

The assembly of the side folder 244 and the male point-forming member 246 is urged into the retracted position illustrated in FIGS. 1 to 3 inclusive by a spring 258 which is operatively connected to one of the carrier arms 254 and to the machine frame. Respective actuating means are connected to the side-turning and point-forming mechanism 158 for sequentially rocking the side folder 244 through the required upward arcuate thrust about the rocker shaft 256 and then to thrust the male point-forming member 246 forwardly relative to the female point-forming member 248. The actuating means includes a first actuating lever 260 having a pivotal mount 262 intermediate its ends on upstanding bracket 264 fixed to the machine frame and having one arm 260a underlying and in position to engage a leaf spring 266 projecting thereover and fixed to the underside of the side folder 244. The other arm 260b of the first actuating lever 260 is coupled to the upper operating lever 134 by a resilient connecting element 268. The arcuate movement imparted to the side folder 244 by the first actuating lever 260 may be adjusted and is limited by an adjustable stop 270 which is mounted on the machine frame beneath the arm 260b to limit the downward travel thereof under control of the resilient connecting element 268. A second actuating lever 272 is fixed to the folder carrier shaft 250 and is provided with adjustable stops 274, 276 on the oppositely directed arms 272a, 272b thereof. It will be appreciated that the adjustable stop 274 establishes the rearward position for the side-turning and point-forming assembly, while the forward position is limited by the adjustable stop 276. The arm 272b of the actuating lever 272 is coupled to the upper operating lever 134 by a resilient connecting element 278 which is of a somewhat longer length than the resilient connecting element 268. Accordingly, in response to clockwise rotation of the upper operating lever 134 about its pivotal mount 136 the first actuating lever 260 via its connection 268 is first operative to rock the assembly 158 about the axis of the rocker shaft 256 and then the second actuating lever 272 via its connection 278 is then operative to thrust the assembly forward about the axis of the carrier shaft 250.

At the pickup location L and at the point where the belt backing B and facing F are brought together for joinder there is provided a removable or swingable stop 280 which enables the establishment of a precise orientation of the V-cut forward end $b$ of the belt backing B and the V-shaped folded point $f$ of the belt facing F at the end of the first phase or sequence of machine operation. The stop 280 is mounted for swinging movement substantially in a horizontal plane about a vertical axis between the operative position, shown by the full line in FIGS. 1 to 3 inclusive, and the inoperative position, shown by the dotted lines in FIG. 2, by a double-arm mounting lever 282 which is journaled on an upstanding pivot 284 on the machine frame 12. One arm of the double-arm mounting lever is rigidly connected to the stop 280, while the other arm thereof is coupled by a connecting rod 286 to a bell crank lever 288 which has a substantially horizontally-extending pivotal mount 290 on a standard 291 of the machine frame. The bell crank lever 288 in turn is connected to the arm 122a of the mounting lever 122 by a further connecting rod 292 such that the stop 280 is moved to the retracted or inoperative position in response to the movement of the upper pressing iron 120 and upper conveyor belt 100 into operative relation to the corresponding lower presser iron 116 and the lower conveyor belt 98. Specifically, in response to clockwise pivotal movement of the mounting arm 122a about the pivotal mount 124, a downward thrust is imparted by the connecting rod 292 to the bell crank 288 which turns the same in the counterclockwise direction about the pivotal mount 290 to impart a thrust to the connecting rod 286 which turns the mounting lever 288 about the pivotal mount 284 to withdraw the stop 288 to the inoperative position shown by the dotted lines in FIG. 2.

Further provision is made for automatically moving the movable detecting element 206 from the inoperative or retracted position, illustrated by the full lines in FIGS. 1 to 3 inclusive, to the operative position, shown by the dotted lines in FIG. 1, in response to the engagement of the respective conveyors 98, 100 and the presser irons 116, 120. Specifically, the downwardly extending arm 122b of the mounting lever 122 is connected via a connecting rod 294 to a crank arm 296 fixed to the supporting shaft section 206a of the detecting element 206, appropriate provision being made via the insulating sleeve 298 to electrically isolate the detecting element 206 from the machine frame. As the downwardly extending arm 122b of the mounting lever 122 swings in a clockwise direction about the pivotal mount 124, a pull will be imparted to the connecting rod 294 which turns the crank arm 296 in the clockwise direction about the supporting shaft section 206a to move the detecting element 206 in the direction of the directional arrows as shown in FIG. 1 into the dotted line operating or detecting position.

Provision is made for the controlled application of the adhesive to the belt backing B via the adhesive-applying unit 156 under control of the operator. This control includes a circuit making and breaking unit, generally designated by the reference numeral 300, which includes a stationary contact blade 302 and a movable contact 304 normally in electrical contact with the blade 302 and completing a circuit as will hereinafter be described. One arm 304a of the movable contact is coupled via a self-adjusting linkage 306 to the arm 197 connected to the hand lever 64 such that in response to counterclockwise movement of the hand lever 64 about the pivotal mount 68, an upwardly directed thrust is imparted via the self-adjusting linkage 306 to the contact 304 to break the circuit established between the stationary blade 302 and the contact 304a. As will be detailed hereinafter, opening of the switch or circuit provided via the blade 302 and contact 304 initiates the flow of adhesive to the head or unit 156. Further, the contact 304 may be automatically closed at a prescribed time during the operating cycle of the machine under control of the piston rod 226 of the air-operated actuated mechanism 228. Specifically, the piston rod 226 carries an abutment 308, which after a prescribed vertical thrust of the piston rod, engages a further abutment 310 fixed at a prescribed point to a supporting rod 312. The rod 312 is guided on the machine frame for vertical reciprocation and is pivotally connected to the arm 304b of the contact 304. Accordingly, when the contact 304 is manually opened by operation of the hand lever 64, the circuit opened by the movement of the contact 304 relative to the contact blade 302 may be automatically closed when the air-operated actuating mechanism 228 is placed into operation. It will be appreciated that the timing of the closing of the contact 304 in the operating cycle will be determined by the spacing of the abutment 310 from the abutment 308 and the interval required for the abutment 308 to come into contact with the abutment 310.

Further provision is made for the automatic supply of the adhesive to the adhesive-applying unit 156 during the machine operation. Specifically, a normally closed microswitch 314 is mounted beneath the upper operating lever 134, with the switch contact 314a being positioned to open the normally closed switch 314 in response to clockwise rotation or rocking of the upper operating lever 134 about its pivotal mount 136 incident to the controlled air valve 86 to the cylinder 72.

Reference will now be made to FIG. 14 which is a schematic and diagrammatic view showing the interconnection of the several controls incorporated in my belt-making machine. The input lines 320, 322, one of which includes a main switch 324 illustrated herein as being closed, are connected to a power transformer 326 which has its low voltage secondary connected in a series circuit with the enerization coil 328a of a solenoid controlled switch or relay 328. The contact pair 328b of the relay 328 is open when the coil 328a is energized. The energization coil 328 is connected in a series circuit including the secondary of the voltage transformer 326, the normally closed microswitch 314, and the normally closed contacts 302, 304 to ground such that when the main switch 324 is closed, an energization circuit for the relay coil 328a is completed to open the contact pair 328b. This energization circuit may be disrupted by either opening the microswitch 314 which is under control of the operating lever 134 or by opening the contact pair 302, 304 by operation of the hand lever 64. The normally open contact pair 328b is connected in an energization circuit for the solenoid controlled valve 234, namely in series with the energization coil 234a thereof by lines 330. 332 which are connected respectively to the input lines 320, 322. The drive motor 32 is also connected across the lines 330, 332.

Although not shown in the illustrative embodiment, the schematic diagram of FIG. 14 further shows a glue reservoir 336 which receives air under pressure through an air inlet pipe 338 and dispenses a supply of the glue or adhesive to the adhesive applying unit via the flexible conduit 214.

A typical cycle or sequence of operations will now be described to facilitate a more thorough understanding of the invention:

With the main switch 324 closed, the operator first depresses the operating lever or handle 64 to facilitate the insertion of the belt backing B along the backing path. The feeler member 206 is in its retracted position and does not come into its operative position until such time as the upper operating lever 134 is pivoted in the clockwise direction about its pivotal mount 136. The operator then rocks the operating lever 64 in the counterclockwise direction which is effective to open the contact pair 302, 304 which in turn interrupts the energization circuit for the relay 328 and thereby closes the contact pair 328c. This completes the energization circuit for the solenoid controlled valve 234 and ports the valve such that the stop or abutment 308 on the piston 228 moves upwardly. The piston movement opens until such time as the abutment 308 moves through its lost motion travel relative to the abutment 310 and contacts the abutment 310 to close the contact pair 302, 304. When the energization circuit for the relay 234 is completed, the circuit for the motor 32 is also completed such that during the interval when the contact pair 302 304 is open, drive is imparted to the belt-backing conveyor for moving the forward portion of the length of belt backing B past the adhesive-applying unit 156 to bring the leading pointed end b of the belt backing B into the pickup location L against the stop 280. Incident to the upward stroke of the piston 226 the abutment 308 contacts the abutment 310 to restore the contacts 302, 304 to the closed position and the operating lever 64 is returned to its normal position as illustrated in the drawings. Thereupon the operator rocks lever 64 upwardly and depresses the foot pedal 88 of the solenoid controlled air valve 86 for the piston and cylinder 72. This causes air to be admitted via the conduit 96 to the lower end of the cylinder 72 to urge the piston therein and piston rod 74 upwardly which rocks the operating levers 80, 134 in the clockwise direction about their respective pivots 82, 136. In the first portion of the rocking movement of the upper operating lever 134, the point-forming mechanism 158 is actuated subsequently, the connections 268, 278 and via the actuating rod 142 brings the upper conveyor 100 and movable presser 120 to the operative position, with the stop 280 being retracted from the pickup location L and the other related operations occurring as previously described. At the proper time in the cycle, the upper operating lever 134 opens the microswitch 314 which disrupts the energization circuit for the solenoid-controlled switch 328 which allows the contact pair 328b to close to energize the solenoid controlled valve 234 such that the adhesive-applying unit is again operated. The drive to the belt backing conveyor and to the respective cooperating conveyors 98, 100, causes the superposed belt facing F and belt backing B to be advanced along the laminating or pressing path through the presser rollers 20, 22. As the trailing end of the length of backing passes the contacts or rods 200, 202 and the feeler member 206 which is in its operative position, a circuit is completed via the feeler member 206 which provides a connection to ground for the secondary of the power or voltage transformer 326 which energizes the relay 228 to open the contact pair 328b to interrupt the operation of the machine and conditions the control circuit for the next sequnce of operations. When the belt has passed through the belt-making machine, the operator removes his foot from the pedal 88 of the control 86.

From the foregoing it will be appreciated that there is provided in accordance with the present invention an improved method and mechanism for the manufacture of belts of the type including a cut length of belt facing and a cut length of belt backing which may be fed into my machine as matched pairs for lamination or joinder of the belt backing and facing, with the proper registry between the V-shaped folded point on the length of belt facing and the V-cut point on the length of belt backing. The machine and method herein are exceptionally flexible in use and are compatible with accepted systems for the manufacture of belts.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. In a belt-making machine, a support, a stop on said support at an intermediate assembly location, conveying and guiding means for advancing a length of backing along a first feed path to an assembly position with its leading end engaging said stop, guide means providing a second feed path for a length of belt facing, a point-forming mechanism operable to point the leading end of said length of facing and including a tongue operative to advance the pointed leading end of said facing along said second feed path to said assembly position with said pointed leading end engaging said stop, an adhesive applying head along said first feed path in advance of said stop for applying adhesive to said length of backing, a source of adhesive under pressure, means connecting said source to said head and including a normally closed valve, and means for imparting drive to said conveying and guiding means and for opening said valve so that said length of backing may be advanced to said assembly position with the application of adhesive thereto.

2. In a belt-making machine, a support, a stop on said support at an intermediate assembly location, conveying and guiding means for advancing a length of backing along a first feed path to an assembly position with its leading end engaging said stop, means defining a second feed path for a length of belt facing, a point-forming mechanism operable to point the leading end of said length of facing and including a tongue operative to advance the pointed leading end of said facing along said second feed path to said assembly position with said pointed leading end engaging said stop, an adhesive applying head along said first feed path in advance of said stop for applying adhesive to said length of backing, a source of adhesive under pressure, means connecting said source to said head and including a normally closed valve, means for imparting drive to said conveying and guiding means and for opening said valve so that said length of backing may be advanced to said assembly position with the application of adhesive thereto, conveying and pressing means adapted to engage said lengths of backing and facing at said assembly location, and means for engaging said conveying and pressing means with said lengths of backing and facing for securing said lengths together in confronting relation.

3. In a belt-making machine, a support, conveying and guiding means on said support for advancing the leading end of a length of backing along a first feed path to an assembly position, guide means providing a second feed path for a length of belt facing, a point-forming mechanism on said support operable to point the leading end of said length of facing and including a tongue operative to advance the pointed leading end of said facing along said second feed path to said assembly position in superposed relation to said leading end of said length of backing, an adhesive applying head along said first feed path for applying adhesive to said length of backing, a source of adhesive, means connecting said source to said head and including a normally closed valve, and means for imparting drive to said conveying and guiding means and for opening said valve so that said length of backing may be advanced to said assembly position with the application of adhesive thereto.

4. A belt-making machine for assembling a length of belt facing to a length of belt backing to form an assembly with the leading ends of the assembly in a V-point comprising a support, first and second horizontally extending presser rollers journaled one above the other on said support, a drive for said presser rollers including a selectively engageable clutch, a first conveyor including a belt trained about said first presser roller, a second conveyor including a belt trained about said second presser roller, means including a presser iron movably mounting said second conveyor into coacting relation with said first conveyor for advancing the assembly toward and through said presser rollers, feed means providing a first feed path for advancing a length of belt backing into a pick-up location relative to said first and second conveyors, guide means defining a second feed path for said belt facing, a movable stop at said pick-up location and engaged by the respective leading ends of said belt backing and belt facing, a point-forming mechanism for pointing the forward end of a length of belt facing and including a male pointer blade operative to advance the pointed leading end of said belt facing along said second path into said pick-up location and a female point forming element associated with said male pointer blade, an adhesive applying head along said first path, a reservoir adapted to contain an adhesive, means including a normally closed valve for connecting said reservoir to said head for the application of adhesive to said belt backing during advance along said first feed path, actuating means for periodically opening said valve and including first and second control switches arranged so that opening of either control switch is effective to open said valve, first operating means for actuating said feed means and for opening said first control switch so that said belt backing may be advanced along said first feed path to said pick-up location with the application of adhesive thereto, and second operating means for actuating said point-forming mechanism, withdrawing said stop from said pick-up location, moving said presser iron and second conveyor into coacting relation with said first conveyor, opening said second control switch so that said belt backing may be further advanced along said first feed path with the application of adhesive thereto, engaging said clutch for said drive for said presser rollers, and actuating said feed means.

5. A belt-making machine for assembling a length of belt facing to a length of belt backing to form an assembly with the leading ends of the assembly in a V-point comprising a support, first and second horizontally extending presser rollers journaled one above the other on said support, a drive for said presser rollers including a selectively engageable clutch, a first conveyor including a belt trained about said first presser roller, a second conveyor including a belt trained about said second presser roller, means incuding a presser iron movably mounting said second conveyor into coacting relation with said first conveyor for advancing the assembly toward and through said presser rollers, feed means providing a first feed path for advancing a length of belt backing into a pick-up location relative to said first and second conveyors, guide means defining a second feed path for said belt facing, a point-forming mechanism for pointing the forward end of said length of belt facing and including a male pointer blade operative to advance the pointed leading end of said belt facing along said second path into said pick-up location and a female point forming element associated with said male pointer blade, an adhesive applying head along said first path, a reservoir adapted to contain a supply of adhesive, means including a normally closed valve for connecting said reservoir to said head for the application of adhesive to said belt backing during advance along said first feed path, actuating means for periodically opening said valve and including first and second control switches arranged such that opening of either control switch is effective to open said valve, first operating means for actuating said feed means and for opening said first control switch so that said belt backing may be advanced along said first feed path to said pick-up location with the application of adhesive thereto, and second operating means for actuating said point-forming mechanism, moving said presser iron and second conveyor into coacting relation with said first conveyor, opening said second control switch so that said belt backing may be further advanced along said first feed path with the application of adhesive thereto, engaging said clutch for said drive for said presser rollers, and actuating said feed means.

6. A belt-making machine for assembling a length of belt facing to a length of belt backing to form an assembly with the leading ends of the assembly in a V-point comprising a support, first and second horizontally extending presser rollers journaled one above the other on said support, a drive for said presser rollers including a selectively engageable clutch, a first conveyor including a belt trained about said first presser roller, a second conveyor including a belt trained about said second presser roller, means including a presser iron movably mounting said second conveyor into coacting relation with said first conveyor for advancing the assembly toward and through said presser rollers, feed means providing a first feed path for advancing a length of belt backing into a pick-up location relative to said first and second conveyors, guide means defining a second feed path for said belt facing, a movable stop at said pick up location and engaged by the respective leading ends of said belt backing and belt facing, a point-forming mechanism for pointing the forward end of a length of belt facing and including a male pointer blade operative to advance the pointed leading end of said belt facing along said second path into said pick-up location and a female point forming element associated with said male pointer blade, an adhesive applying head along said first path adapted to apply adhesive to said belt backing, a reservoir adapted to contain a supply of adhesive, means including a normally closed valve for connecting said reservoir to said head for the application of adhesive to said belt backing during advance along said first feed path, actuating means for periodically opening said valve including first and second control switches arranged so that opening of either control switch is effective to open said valve, first operating means for actuating said feed means and for opening said first control switch so that said belt backing may be advanced along said first feed path to said pick-up location with the application of adhesive thereto, second operating means for actuating said point-forming mechanism, withdrawing said stop from said pick-up location, moving said presser iron and second conveyor into coacting relation with said first conveyor, opening said second control switch so that said belt backing may be further advanced along said first feed path with the application of adhesive thereto, engaging said clutch for said drive for said presser rollers, and actuating said feed means, sensing means along said first feed path for detecting the passage of the trailing end of said length of belt backing, and means responsive to said sensing means for interrupting the operation of said machine.

7. A belt-making machine for assmbling a length of belt facing and a length of belt backing to form an assembly with the leading ends of the assembly in a V-point comprising a support, pressing and conveying means including a movable presser iron for advancing the assembly along a pressing path, a selectively engageable drive for said pressing and conveying means, feed means providing a first feed path for advancing a length of belt backing into a pick-up location relative to said pressing and conveying means, guide means defining a second feed path for said belt facing, a movable stop at said pick-up location and engaged by the respective leading ends of lengths of belt backing and belt facing, a point-forming mechanism for pointing the forward end of a length of belt facing and including a male pointer blade operative to advance the pointed leading end of said belt facing along said second path into said pick-up location and a female point-forming element associated with said male pointer blade, an adhesive-applying head along said first path adapted to apply adhesive to said length of belt backing, a reservoir adapted to contain a supply of adhesive, means including a normally closed valve for connecting said reservoir to said head for the application of adhesive to said belt backing during advance along said first feed path, actuating means for periodically opening said valve including first and second control means arranged so that operation of either of said control means is effective to open said valve, first operating means for actuating said feed means and for operating said first control means so that said belt backing may be advanced along said first feed path to said pick-up location with the application of adhesive thereto, and second operation means for actuating said point-forming mechanism, withdrawing said stop from said pick-up location, moving said presser iron to an operative position along said pressing path, operating said second control means so that said belt backing may be further advanced along said first feed path with the application of adhesive thereto, engaging said drive, and actuating said feed means.

8. In a belt-making machine for assembling a length of belt facing and a length of belt backing to form an assembly with the leading ends of the assembly in a V-point, a support, feed means providing a first feed path for advancing a length of belt backing into a pick-up location, guide means defining a second feed path for said belt facing, an adhesive-applying head along said first path, a reservoir adapted to contain a supply of adhesive, means including a normally closed valve for connecting said reservoir to said head for the application of adhesive to said belt backing during advance along said first feed path, actuating means for periodically opening said valve including first and second control means arranged so that operation of either of said control means is effective to open said valve, first operating means for actuating said feed means and for operating said first control means so that said belt backing may be advanced along said first feed path to said pick-up location with the application of adhesive thereto, and second operating means for actuating said second control means so that said belt backing may be further advanced along said first feed path with the application of adhesive thereto and for actuating said feed means.

9. In a belt-making machine for assembling a length of belt facing and a length of belt backing to form an assembly with the leading ends of the assembly in a V-point, a support, feed means for advancing a length of belt backing along a first path into a pick-up location, guide means providing a second feed path for a length of belt facing, a point-forming mechanism for pointing the forward end of said length of belt facing and including a male pointer blade operative to advance the pointed leading end of said belt facing along said second path into said pick-up location and a female point forming element associated with said male pointer blade, an adhesive-applying head along said first path, a reservoir adapted to contain a supply of adhesive, means including a normally closed valve for connecting said reservoir to said head for the application of adhesive to said belt backing during advance along said first feed path, actuating means for periodically opening said valve including first and second control means arranged so that operation of either of said control means is effective to open said valve, first operating means for actuating said feed means and for operating said first control means so that said belt backing may be advanced along said first feed path to said pick-up location with the application of adhesive thereto, and second operating means for actuating said point-forming mechanism, operating said second control means so that said belt backing may be further advanced along said first feed path with the application of adhesive thereto, and actuating said feed means.

10. A belt-making machine for assembling a length of belt facing and a length of belt backing to form an assembly with the leading ends of the assembly in a V-point comprising a support, pressing and conveying means including a movable presser iron for advancing the assembly along a pressing path, a selectively engageable drive for said pressing and conveying means, feed means providing a first feed path for advancing a length of belt backing into a pick-up location relative to said pressing and conveying means, guide means providing a second feed path for a length of belt facing, a point-forming mechanism for pointing the forward end of said length of belt facing and including a male pointer blade operative to advance the pointer leading end of said belt facing along said second path into said pick-up location and a female point-forming element associated with said male pointer blade, an adhesive applying head along said first path, a reservoir adapted to contain a supply of adhesive, means including a normally closed valve for connecting said reservoir to said head for the application of adhesive to said belt backing during advance along said first feed path, actuating means for periodically opening said valve, first operating means for operating said actuating means so that said belt backing may be advanced along said first feed path to said pick-up location with the application of adhesive thereto, second operating means for actuating said point-forming mechanism, moving said presser iron to an operating position along said pressing path, and operating said actuating means so that said belt backing may be further advanced along said first feed path with the application of adhesive thereto.

11. A belt making machine for assembling a belt having a pointed forward end from a length of belt backing and a length of belt facing comprising means providing a first feed path adapted to receive a length of belt backing, belt backing feed means adapted to advance said belt backing along said first feed path, a controlled adhesive-applying unit arranged along said first path and adapted to apply adhesive to said belt backing, a belt-backing sensing device arranged along said first path and effective to sense when the rear end of said belt backing has passed into said first feed path, means providing a second feed path adapted to receive a length of belt facing and including side-forming means and point-forming means, said first feed path means and said second feed path means being positioned one above the other and each terminating at a common pick-up location, a stop, swingable means mounting said stop for movement between a first position at said pick-up location where said stop is effective to position the ends of said belt backing and said belt-facing in juxtaposed relation and a second inoperative position removed from said pick-up location, a pressing and conveying means comprising a first presser roller and a second presser roller positioned one above the other, said pressing and conveying means adapted to receive said length of belt backing and said length of belt facing at said pick-up location, and mount means mounting said pressing and conveying mechanism for movement of one of said presser rollers into and out of operative relation with other of said rollers, a linkage secured to and extending between said mount means and said swingable means for said stop, said linkage being effective to move said stop from said pick-up location when said presser rollers are moved into an operative relationship, drive means for said pressing and conveying means and for said belt backing feed means, and control means for said belt making machine which are effective to systematically activate said belt backing feed means, said adhesive-applying means, said point forming means, said mounting means for said stop and said pressing and conveying mechanism.

12. A belt making machine for assembling a belt having a pointed forward end from a length of belt backing and a length of belt facing comprising means providing a first feed path adapted to receive a length of belt backing, belt backing feed means adapted to advance said belt backing along said first feed path, a controlled adhesive-applying unit arranged along said first path and adapted to apply adhesive to said belt backing, a belt-backing sensing device arranged along said first path and effective to sense when the rear end of said belt backing has passed into said first feed path, means providing a second feed path adapted to receive a length of belt facing and including side-forming means and point-forming means, said first feed path means and said second feed path means being positioned one above the other and each terminating at a common pick-up location, a stop, swingable means mounting said stop for movement between a first position at said pick-up location where said stop is effective to position the ends of said belt backing and said belt-facing in juxtaposed relation and for further movement to an inoperative position removed from said pick-up location, pressing and conveying means adapted to receive said length of belt backing and said length of belt facing at said pick-up location, drive means for said pressing and conveying means and for said belt backing feed means, and control means for said belt making machine comprising means to initiate operations of said machine and to start the operation of said adhesive-applying means and said belt backing feed means, and means secured to said swingable means for systematically affecting the operations of said point forming means, said pressing and conveying means, and to remove said stop from its operative position at said pick-up location to its inoperative position.

13. A belt making machine for assembling a belt having a pointed forward end from a length of belt backing and a length of belt facing comprising means providing a first feed path adapted to receive a length of belt backing, belt backing feed means adapted to advance said belt backing along said first feed path, a controlled adhesive—applying unit arranged along said first path and adapted to apply adhesive to said belt backing, a belt-backing sensing device arranged along said first path and effective to sense when the rear end of said belt backing has passed into said first feed path, means providing a second feed path adapted to receive a length of belt facing and including side-forming means and point-forming means, said first feed path means and said second feed path means being positioned one above the other and each terminating at a common pick-up location, a stop, swingable means mounting said stop for movement between a first position at said pick-up location where said stop is effective to position the ends of said belt backing and said belt-facing in juxtaposed relation and a second inoperative position removed from said pick-up location, a pressing and conveying mechanism comprising a first presser roller and a second presser roller positioned one above the other, first and second conveying means operatively connected respectively to said presser rollers and adapted to receive said length of belt backing and said length of belt facing at said pick-up location, means mounting one of said roller and conveying means from an operative position to an inoperative position, and a presser iron adapted to press said lengths of belt backing and belt facing as they are transported by said conveying means, drive means for said pressing and conveying means and for said belt backing feed means, and control means for said belt making machine comprising means to manually initiate the operation of said machine and to start the operation of said controlled adhesive applying means and said belt backing feed means, means engaging said swingable means to affect operation of said point-forming means, means to bring said presser roller and conveying means into operative relationship and to move said stop into its inoperative position, and feeler means for engaging and detecting the trailing end of said belt backing and for interrupting the operations of said adhesive applying unit and for conditioning said control means for a subsequent cycle of operation.

References Cited in the file of this patent

UNITED STATES PATENTS

| | | |
|---|---|---|
| 2,100,342 | MacKenzie | Nov. 30, 1937 |
| 2,255,854 | MacKenzie | Sept. 16, 1941 |
| 2,336,421 | Prue | Dec. 7, 1943 |
| 2,635,670 | Winberg | Apr. 21, 1953 |
| 2,685,908 | Loew | Aug. 10, 1954 |
| 2,702,067 | Goldberg | Feb. 15, 1955 |
| 2,736,045 | Kamborian | Feb. 28, 1956 |
| 2,761,418 | Russell | Sept. 4, 1956 |
| 2,807,307 | Brooks et al. | Sept. 24, 1957 |